United States Patent

Gluck et al.

[15] 3,696,908

[45] Oct. 10, 1972

[54] CAPACITIVE KEY

[72] Inventors: Julius Gluck, Stamford; Raul Lara, Norwalk, both of Conn.

[73] Assignee: Sperry Rand Corporation, New York, N.Y.

[22] Filed: Nov. 9, 1970

[21] Appl. No.: 88,024

[52] U.S. Cl. ....................197/98, 340/365, 179/90 K, 235/145

[51] Int. Cl. ....................B41j 5/08

[58] Field of Search ..........197/17, 98; 340/365, 173; 179/90 K; 235/145, 146; 178/79, 81; 307/88 ET; 200/52, DIG. 1

[56] References Cited

UNITED STATES PATENTS

| | | | |
|---|---|---|---|
| 3,293,640 | 12/1966 | Chalfin et al | 340/365 C |
| 3,588,875 | 6/1971 | Gabor | 340/365 |
| 3,363,737 | 1/1968 | Wada et al | 197/98 |
| 3,551,616 | 12/1970 | Juliusburger | 197/98 UX |
| 3,584,162 | 6/1971 | Krakinowski | 179/90 K |
| 2,620,056 | 12/1952 | Kupper | 197/17 |
| 2,600,200 | 6/1952 | Brink | 197/17 |
| 3,419,697 | 12/1968 | Gove | 200/52 X |
| 3,119,996 | 1/1964 | Comstock | 340/365 C |
| 3,653,038 | 3/1972 | Webb et al. | 340/365 |

OTHER PUBLICATIONS

Abbatecola et al. " Threshold Capacitive Key" IBM Tech. Disc. Bull., Vol. 13 No. 11 April 1971, 3301

Ecker, " Capacitive Keyboard Unit" IBM Tech. Disc. Bull., Vol. 13 No. 9 February 1971 2544

McDowell et al. " Contactless Keyboard" IBM Tech. Disc. Bull., Vol. 12, No. 8 Jan. 1970, 1166

*Primary Examiner*—Robert E. Pulfrey
*Assistant Examiner*—R. T. Rader
*Attorney*—Thomas P. Murphy, Marshall M. Truex, Frank A. Seemar and Louis Altman

[57] ABSTRACT

This is a capacitive keying device suitable for use in an electronic keyboard. Depression of the key drives a stem which stresses a spring beyond the release threshold of a magnetic latch. A projectile is then fired, impacting upon a flexible sheet capacitor electrode. The resulting electrode deflection causes a momentary increase in capacitive coupling.

14 Claims, 7 Drawing Figures

*INVENTOR.*
JULIUS GLUCK
RAUL LARA
*BY*
Louis Altman
ATT'Y

CAPACITIVE KEY

FIELD OF THE INVENTION

This invention relates to keying mechanisms of the type used in keyboards for various devices, including typewriters and other data processing equipment.

BACKGROUND OF THE INVENTION

Manually operated keyboards producing electronic outputs are employed in a variety of devices, ranging from electronic musical instruments to data processing equipment. Examples of the latter are electric typewriters, automatic typewriters, teletypewriters, and control consoles for digital computers. The designers of such keyboards often wish to avoid the use of mechanical switch contacts since they create problems during manufacture and assembly, are subject to wear during use, accumulate dirt which affects their electrical resistance, and are subject to contact bounce which generates spurious electrical transients. To avoid these problems, efforts have been made in recent years to design keying devices with electronic transducers in place of mechanical contacts. To date, however, none of these approaches has proved entirely satisfactory.

One prior art approach employs a tuned circuit, and a movable slug which moves into the interior of the inductor of the tuned circuit when a key is depressed. This type of keying mechanism does not suffer from the problem of contact bounce. On the other hand, it is lacking in touch feedback; i.e. a tactile impression which tells the operator that a particular key depression has been consummated. Another disadvantage of this approach is that it throws the entire burden of data encoding upon logic circuitry external to the keyboard. In addition, tuned circuit keyboards provide a level electrical output waveform so long as the slug is inserted into the inductor. Such waveforms are desirable for a small minority of key functions, but the great majority of key functions are preferably represented by pulse form electrical outputs. Pulse outputs have sharply rising leading edges, which simplify the logic circuitry required to distinguish the sequence of key depressions when two of them overlap in time; a common occurrence.

Another prior art approach employs a tuned circuit in conjunction with a regenerative circuit to provide a sharper leading edge for the electrical output waveform. This approach makes it easier to detect the sequence of key actuations; but the regenerative circuitry is costly and the key action still lacks touch feedback.

A different prior art approach is to employ piezo-electric elements which generate sharp electrical pulse outputs upon mechanical impact. The impact is achieved by employing a snap action latch mechanism which first stores energy when stressed, and then, when the stress reaches a threshold level, releases the stored energy to fire a projectile. The threshold mechanism provides touch feedback and a low, adjustable and consistent key actuating force; but this approach does not take any of the data encoding burden off the external logic circuitry. In addition the piezo-electric elements are cantilevers, which present mechanical problems.

The most promising devices yet developed are keying mechanisms of the variable capacitor type. Until now, however, such mechanisms have needed improvement in one or more respects. In one such device the movable capacitor electrode is mounted directly on a projectile. Experience has shown, however, that this design causes problems of dynamic alignment which complicate the manufacture and assembly of the keying mechanism. In addition, this type of key does not provide any encoding assistance.

Another previously developed capacitive keying device provides two static capacitor electrodes on a printed circuit board below each projectile, but does not employ these electrodes to derive independent output circuits, as required for encoding. In this design, each pair of static electrodes must be connected in series. This not only precludes the parallel circuit configuration required for independent outputs; but it also produces a four-fold reduction in total capacitance, and therefore in output signal amplitude and signal-to-noise ratio, by comparison to a parallel circuit configuration.

THE INVENTION

The present invention also provides two static capacitor electrodes for each keying mechanism, but the electrodes are connected in parallel, to independent output circuits. Thus, they are capable of driving separate data encoding inputs. The parallel circuit configuration also provides much greater capacitance and output signal amplitude.

A common dynamic electrode is mounted above the static electrodes, and is capacitively coupled thereto. Instead of being mounted on the projectile for movement therewith, however, the dynamic electrode is mounted at a fixed location and is flexed as the result of a sharp projectile impact thereon. This achieves a sharp output pulse rise, without incurring the dynamic alignment problems that are associated with mounting of the electrode upon the projectile.

A keyboard using this approach is less expensive than other alternative designs, primarily because its encoding capability eliminates a significant amount of external diode gate encoding circuitry. The fact that it avoids dynamic alignment problems simplifies the mechanical structure and makes it more reliable. The larger signal output reduces signal-to-noise ratio problems. The sharp output pulse rise makes it relatively easy to design external logic for distinguishing the sequence of key actuations. The threshold keying mechanism provides touch feedback, yet it is not difficult to design external circuitry which minimizes the problem of electrical transients due to mechanical bounce. Moreover, as to those key functions for which a level output rather than a pulse waveform is desired, other external circuitry according to the invention not only provides the desired level signals, but allows these to be encoded by the same circuitry which handles the pulse form outputs.

BRIEF DESCRIPTION OF THE DRAWINGS

The same reference numerals refer to the same elements throughout all the views of the drawing.

DETAILED DESCRIPTION OF THE PREFERRED EMBODIMENT

Figure 1:
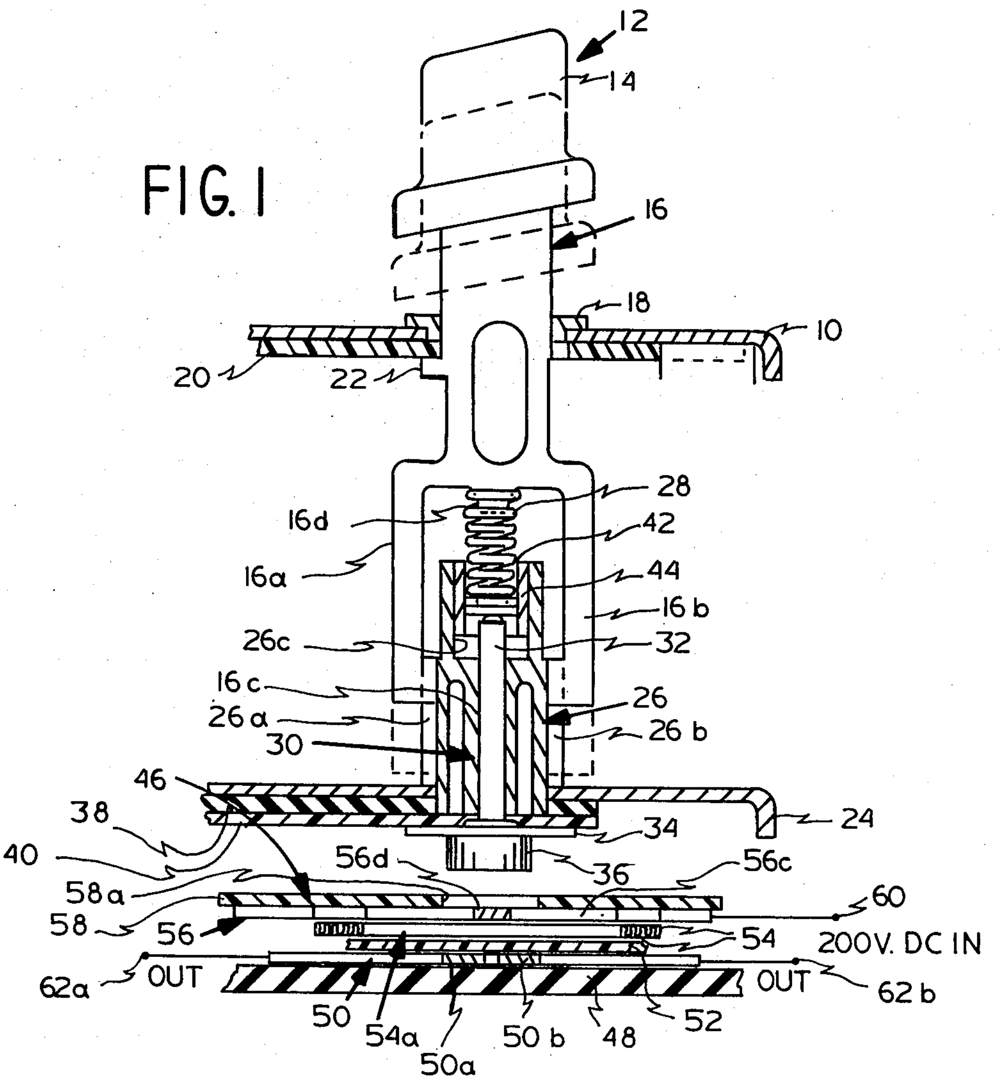
FIG. 1 is a vertical section, taken along lines 1 — 1 of FIG. 4 looking in the direction of the arrows, of a single capacitive key mechanism embodying this invention, when it is at rest.

With reference to FIG. 1, this invention contemplates a keyboard for use in an electric typewriter, automatic typewriter, teletypewriter, computer console or other data generating device, which includes an upper frame 10 on which are mounted a plurality of individual snap action keying mechanisms for each of the various alphanumeric characters, punctuation marks and control instructions required. Only one such keying mechanism, generally designated 12, is illustrated in FIG. 1. It includes a finger-tip-responsive plastic pushbutton 14 pressed onto the upper end of a vertically oriented keystem 16. The keystem is formed from a sheet metal stamping, and is guided for vertical movement within a suitable opening in a plastic guide insert 18 received in the frame 10. A plastic keystem limiting pad 20 on the underside of the frame engages a limit tab 22 protruding horizontally from the keystem 16 to limit its upward travel, and also cushions the impact of the limiting tab 22. Downward travel of the keystem 16 is limited when the pushbutton 14 strikes the guide insert 18.

Below the upper frame 10 is a subframe 24. The lower end of a generally cylindrical lower guide member 26 is received within a suitable opening in the subframe 24, directly below the keystem 16. The lower end of the keystem is formed with a pair of opposed depending arms 16a and 16b, which embrace the lower guide 26 and terminate in tabs which slide vertically within guiding channels 26a and 26b respectively formed on either side of the lower guide member, further to guide the vertical motion of the keystem 16.

A projectile, generally designated 30, includes a rod 32 which is slidable within a vertical cylindrical bore 16c formed axially through the lower guide 26, a ferromagnetic disk 34 secured to the lower end of the rod 32, below the lower guide 26 and the subframe 24, and a plastic bumper tip 36 secured to the lower surface of the ferromagnetic disk. On the lower surface of the subframe 24 is a layer of permanent magnet material 38, for example an impregnated rubber composition, which attracts the ferromagnetic disk 34, and thus the entire projectile 30, upwardly toward a rest position (FIG. 1); i.e. the position which the projectile occupies when the keying mechanism 12 is not actuated. A thin layer of vinyl tape 40 adheres to the lower surface of the magnet 38, to prevent abrasion of the magnet without introducing an excessive air gap.

The keystem 16 and the projectile 30 move essentially independently of each other relative to lower guide 26, but they are coupled by a projectile firing spring 28 of the helical coil type which is in compression between them. At its upper end, the spring 28 is loosely caged between the lower arms **16*a* and 16*b* of the keystem, and impaled upon a spring guide tab 16*d* which projects downwardly from the keystem and axially into the interior of the spring. At its lower end, the spring is received within a cup 42 which is press fit into an enlarged axial bore 26c at the upper end of the guide 26. A button 44 engages the upper end of the projectile rod 32, and is small enough in diameter to reciprocate freely within the interior of the cup 42 as the projectile 30 moves vertically, but large enough in diameter to be urged downwardly by the lower end of the firing spring 28**.

When the projectile 30 is in its rest position (that is, prior to actuation of the keying mechanism 12) the ferromagnetic disk 34 is pulled snugly upwardly against the magnet cover 40 by the permanent magnet 38, causing the rod 32 to move upwardly within the bore **26*c* and the button 44 to press upwardly against the lower end of the firing spring 28. The resulting compression of the firing spring causes it to bias keystem 16 and pushbutton 14 to their upward limiting positions; i.e. until the limiting tab 22 strikes the pad 20 on the underside of the frame 10. This is the rest position of the keystem 16. When both the projectile 30 and the keystem 16 are in their respective rest positions, the firing spring 28 is compressed somewhat, but not enough to disengage the projectile disk 34 from the flux field of permanent magnet 38**.

When the pushbutton 14 and keystem 16 are depressed below their rest positions, however, the firing spring 28 is compressed further; and at some point, before the lower limiting position of the keystem is reached, the increased force exerted by the spring 28 upon the button 44 and projectile 30 exceeds the attractive capacity of the permanent magnet 38. At that point, the projectile firing threshold is reached, and the spring then drives the button 44 and rod 32 downwardly, breaking the disk 34 abruptly free of the magnetic field, and launching the entire projectile 30 toward a printed circuit 46 directly below it. In effect, the permanent magnet 38 and projectile disk 40 cooperate to form a releasable latching mechanism with a sharply defined release threshold, while the firing spring 28 cooperates with the keystem 16 and projectile 30 to form an energy storing system which first builds up the force on the projectile to the release threshold, and then delivers the stored energy in the form of a sudden downward acceleration of the projectile. At the moment of release, the typist can feel the expansion of spring 28 through the pushbutton 14, thus providing desirable touch feedback.

Figures 2, 4, 5:
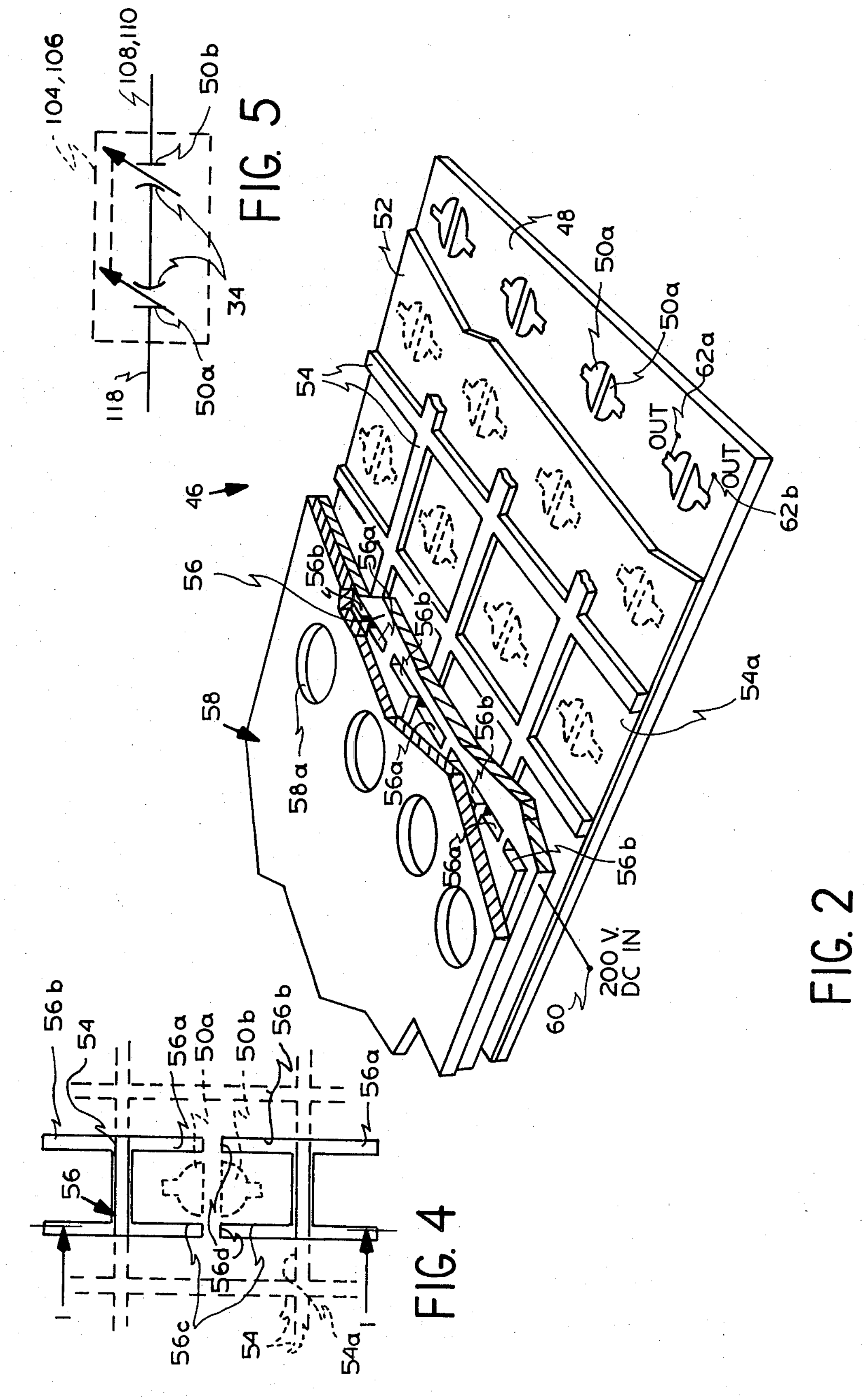
FIG. 2 is a perspective view, with parts broken away for clarity of illustration, of a printed circuit board for use with a keyboard employing a plurality of such keying mechanisms.
FIG. 4 is an enlarged fragmentary plan view of a preferred form of dynamic electrode for the p.c. board of FIG. 2.
FIG. 5 is a schematic equivalent electrical circuit diagram of the level keys of FIG. 3.

As seen in both FIGS. 1 and 2, the printed circuit 46 includes the usual supporting board 48 formed of a stiff insulating material, such as phenolic resin. A static metallic layer 50, which may be copper, is plated in a selective pattern to form static capacitor electrodes and appropriate electrical leads therefor. The printed circuit 46 cooperates with a plurality of the keying mechanisms 12 all mounted on the same keyboard frame 10; and for each of these keying mechanisms the metallic layer 50 includes two static electrodes **50*a*** and 50*b*. Deposited over the metallic layer 50 is a thin sheet of capacitor dielectric material 52 such as a one thousandth of an inch thick layer of Mylar; and over that layer is a spacer lattice 54 formed of a plastic material such as Mylar. This lattice comprises integrally molded, mutually perpendicular, spaced-apart bars forming a planar sheet about five to ten thousandths of an inch thick, and defining interstitial spaces 54*a*. Overlying the lattice 54 is a thin, flexible conductive shim 56, preferably in the form of a four thousandths inch thick sheet of beryllium copper, which forms a common dynamic electrode for all the variable capacitors of each keying mechanism 12 on the keyboard. Finally, an insulating cover layer 58 perforated by openings 58*a* overlies the flexible metal shim, and is preferably formed of a forty thousandths inch thick sheet of Mylar. The choice of insulating materials for members 36, 58 and 54 eliminates stray capacitance, and the beryllium copper of member 56 is selected for fatigue resistance.

The common dynamic electrode shim 56 is capacitively coupled to both static electrodes 50*a* and 50*b* of each keying mechanism 12. When the keying mechanism is at rest, the dielectric which separates each pair of capacitor electrodes 56 and 50*a* or 50*b* is the film 52, in cooperation with the fibers and interstitial air spaces of the lattice 54. The capacitance when the common electrode 56 is thus fully separated from electrodes 50*a* and 50*b* is relatively small. This represents the "no-signal" condition.

One of the perforations 58*a*, one interstitial lattice space 54*a*, and one set of static electrodes 50*a* and 50*b* are aligned directly below each keying mechanism 12. When the keying mechanism 12 is actuated to fire the projectile 30 downwardly, it strikes a hammer blow against the printed circuit 46. The bumper tip 36 is smaller in diameter than the perforation 58*a* of covering layer 58, so that the tip enters the perforation and impacts directly on the shim 56, momentarily deflecting it downwardly into the associated interstitial space 54*a* between the bars of lattice 54. In a preferred embodiment, the deflected portion of the shim 56 is driven into actual contact with the dielectric layer 52. In this position, the flexible electrode plate 56 approaches substantially closer to the cooperating electrodes 50*a* and 50*b* of that particular keying mechanism 12, thereby achieving a substantially greater capacitance relative thereto. During key actuation, cover layer 58 serves to insulate the electrode shim 56 from the metal disc 34 and the rest of the keying mechanism 12.

As illustrated schematically in FIGS. 1 and 2, the common capacitor electrode 56 is connected to a 200 volt DC input represented by terminal 60, while capacitor electrodes 50*a* and 50*b* are connected to respective independent output terminals 62*a* and 62*b* of an external circuit, discussed in greater detail below. The increase in capacitance caused by the deflection of capacitor area plate 56*c* permits a brief, sharp voltage spike to be coupled through the capacitor 56, 50*a*; and another one to be coupled through the parallel-connected capacitor 56, 50*b*; of the particular keying mechanism 12. As a result, two independent output spikes are available from terminals 62*a* and 62*b* respectively. In effect, flexible shim 56 cooperates with the respective electrodes 50*a* and 50*b* to form two independent, but parallel-connected, variable capacitors which are ganged for simultaneous operation when their common keying mechanism 12 is actuated.

This mechanism assures a brief pulse output, whether the typist releases the key mechanism 12 immediately after actuation or not. If the typist releases the key immediately, the resilience of the flexible shim 56 causes the projectile 30 to rebound upwardly therefrom immediately after impact, and the projectile then is recaptured by the permanent magnet 38, to avoid striking the shim again. If the typist holds the key mechanism 12 fully depressed for a time, rebound and recapture are delayed until the key is released, but the electrical output pulse terminates as soon as capacitors 56, 50*a* and 56, 50*b* are fully charged, because the input is D.C.

It is important that the capacitance-increasing deflection be confined to that area of shim 56 which is directly below the particular key mechanism 12 being actuated, and is not spread over a significantly larger area of the shim 56; otherwise troublesome "cross-talk" would be introduced into the capacitive relationship between the common electrode shim 56 and the static electrodes 50 of nearby key mechanisms 12. In a preferred embodiment of the invention, such localization of the shim deflection is accomplished, as illustrated in FIG. 4, by stamping out of shim 56 two rectangular C-shaped cut-outs 56*a* and 56*b* symmetrically located on opposite sides of the projectile impact region of each keying mechanism 12. Preferably, the back-to-back C-shaped cut-outs 56*a* and 56*b* of two adjacent keys 12 are conveniently merged into a single H configuration as seen in FIGS. 2 and 4, for ease of manufacture. These cutouts embrace the opposite ends of respective rectangular areas 56*c*, symmetrically located directly over the static electrodes 50*a* and 50*b* of each key 12; causing the embraced areas to be mechanically decoupled from the remainder of the shim 56. These rectangular areas 56*c* remain coupled to the rest of shim 56 only at their central region, by respective pairs of reduced cross-section connecting spans, or necks, 56*d* located on opposite sides of each area 56*c*. This mechanical decoupling substantially confines shim deflection to the area 56*c* and connecting spans 56*d* of the particular key 12 which is actuated; and to a great extent isolates the remainder of the flexible shim 56 from the projectile impact of that key.

Prior to deflection, the entire shim 56, including decoupled area 56*c*, lies in one plane, as seen in FIG. 1. At that time lattice 54 serves not only as a part of the capacitor dielectric, but also as a mechanical spacer to stand off the entire shim 56 at the proper distance from electrodes 50*a* and 50*b*. During deflection, the lattice continues to serve that function as to the undeflected portion of shim 56, but allows the deflected area 56*c* to enter one of the interstitial spaces 54*a*. In addition, during deflection those bars of lattice 54 which immediately surround the particular deflected area 56*c* perform two further functions both having to do with the reduction of cross-talk: They serve as dielectric barriers isolating the deflected area 56*c* from the static electrodes 50*a* and 50*b* of the neighboring keys 12; and they remain in intimate contact with those areas of shim 56 which are alongside the deflected area 56*c*, thereby cushioning and damping the mechanical vibrations transmitted through the connecting spans 56*d* to those portions of the shim which cooperate with neighboring keys.

Figure 6:
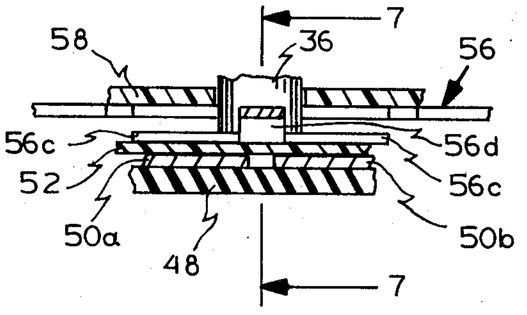
FIG. 6 is a fragmentary sectional view, having the same section plane and viewing direction as FIG. 1, but showing the mechanism in its actuated condition.
Figure 7:
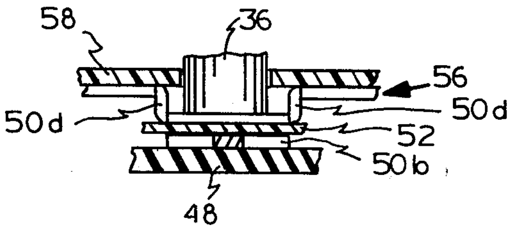
FIG. 7 is a sectional view taken along lines 7 — 7 of FIG. 6, looking in the direction of the arrows.

The cut-outs 56*a* and 56*b* have other beneficial effects, in addition to reducing cross-talk through decoupling. Detaching the rectangular area 56*c* at both ends, and leaving it attached (by spans 56*d*) only at locations alongside the point of projectile impact, permits the entire rectangular area 56*c* to retain a substantially planar configuration (as seen in FIGS. 6 and 7) during deflection. Consequently, only the narrow spans 56*d* are slanted at an angle to the original plane of shim 56 during deflection, while the rectangular area 56*c* is pressed flat against the dielectric layer 52, remaining in a substantially parallel relationship to the original plane of shim 56. This means that the entire area of the principal capacitively coupled region 56*c* makes a maximal approach to its associated static electrodes 50*a* and 50*b*. This maximizes capacitive coupling g during deflection, by distributing it over the broadest possible area, as well as by minimizing the approach distance. The effect is to enhance the output signal amplitude and therefore the signal-to-noise ratio. Furthermore, since the output signal rises to a higher amplitude in a given time, there is an increase in the output pulse rise rate. The latter effect is further enhanced by the increase in compliance which results from the decoupling of area 56*c*. As previously noted, the steeper is the pulse rise rate, the simpler it is to deal with the problem of detecting key actuation sequence.

Figure 3:
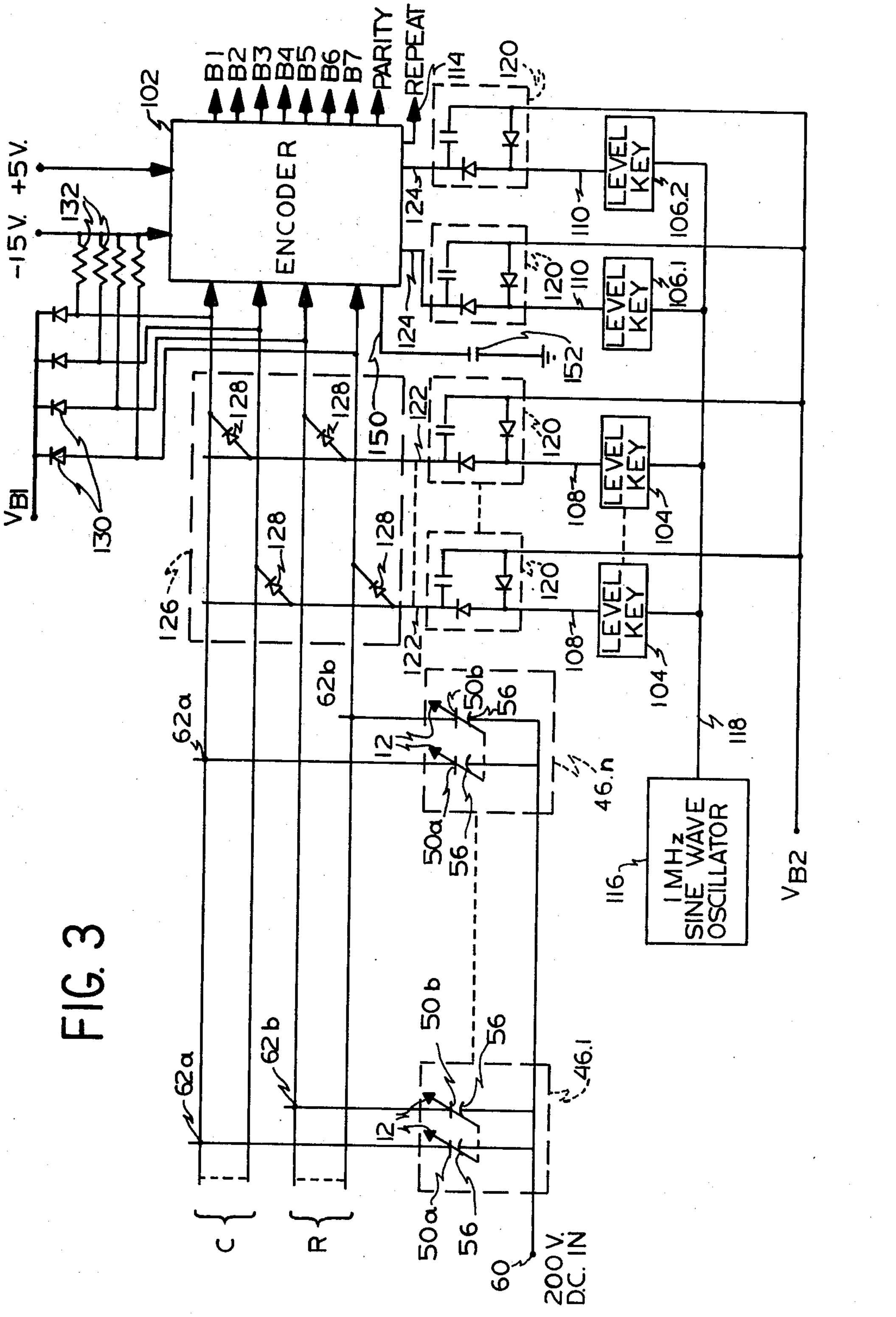
FIG. 3 is a schematic electrical circuit and functional block diagram of the p.c. board of FIG. 2 together with a data encoding circuit in accordance with this invention, for use with the apparatus of the preceding figures.

FIG. 3 shows how the respective independent 16 from static electrodes 50*a* and 50*b* are used to excellent advantage for partial data encoding, in accordance with this invention. A data encoder circuit 102 employing plus five and minus fifteen volt logic levels accepts a coded pair of row and column inputs (designated R and C respectively), and provides a coded alphanumeric output comprising code channels B1 through B7 plus a parity bit. The row inputs R and C themselves represent respective multichannel codes; hence some auxiliary input circuitry is required for partial encoding of the input to circuit 102. In accordance with the present invention, this is inherently performed by the printed circuit board 46 because of the fact that each keying mechanism 12 has two independent output terminals 62*a* and 62*b* as described.

In FIG. 3 the printed circuit 46 is schematically represented by a plurality of variable capacitor circuits 46.1 through 46.*n*, one for each keying mechanism 12 of a typewriter keyboard. Each of these circuits comprises two variable capacitors 56, 50*a* and 56, 50*b*. Electrodes 50*a* and 50*b* are represented by straight lines, reflecting the fact that they are static; while electrode 56 is represented by curved lines, reflecting the fact that it is dynamic, in standard IEEE symbology. The variability arrows represent the keying mechanisms 12, which deflect the dynamic electrode 56; and the dashed line reflects the fact that each pair of capacitors is mechanically ganged. In both a mechanical and an electrical sense, electrode 56 is common to all the capacitors, and is connected to the 200 V. DC input potential on terminal 60. Static electrodes 50*a* are connected to respective output terminals 62*a*, which are distributed in the appropriate encoding logic pattern over the column input leads C; while the availability of another, independent set of static electrodes 50*b* connected to respective output terminals 62*b* permits the latter terminals to be distributed in an entirely independent encoding logic pattern over the row input leads R.

All the row and column leads R and C are connected through respective resistors 132 to the minus 15 volt logic level. The resulting bias current drawn by encoder 102 over the R and C leads is preferably selected so that it just exceeds the maximum bounce current amplitude associated with reverberation of the dynamic electrode 56 after impact. This effectively masks the bounce current, and thus solves the bounce noise problem usually associated with impact type keying mechanisms.

The variable capacitor circuits 46.1 through 46.*n* are operated by those typewriter keys 12 which normally require a pulse form output. These normally include all the alphanumeric characters and punctuation marks with the exception of *x*, underscore, and period. The latter group of keys, plus the backspace, character space, line space and certain control keys, fall into a special category because they require a level electrical output, either to permit automatic repeat actuation, or simply to extend the effective duration of a single key actuation. The *x*, underscore, period, backspace, character space and line space keys, represented by level keys 104 in FIG. 3, are actually pulse *or* level keys; i.e. they can either generate a pulse output when a single printing of *x*, underscore or period, or a single backspacing, character spacing or line spacing operation, is intended; or they can generate a level output when automatic repeat operation is intended. Control keys 106, specifically a case shift key 106.1 and a teletype code shift key 106.2, are capable of level outputs only, because they must always operate for relatively extended time intervals according to the typist's needs. Both types of level keys 104 and 106 are modified versions of the key mechanisms 12 described above.

The repeat keys 104 differ from keys 12 in that they lack the lattice 54, the flexible shim 56, the cover layer 58, and the bumper tip 36, a fact which permits them to have two distinct operating modes. When a key 104 is depressed only to the point of projectile release, a pulse output is generated in the following manner. There are no elements interposed between the metal disk 34 and the dielectric layer 52; and as a result the disk 34 is momentarily pressed flat against dielectric layers 52, acting as an intermediate capacitor plate to couple the static electrodes 50*a* and 50*b* together capacitively. The resulting output has a pulse waveform because it terminates as soon as projectile 30 is recaptured by magnet 38; and it is recognized by the internal logic encoder 102 as a single key actuation. If a repeat key 104 is depressed fully and continuously, however, the disk 34 remains in position to generate a continuous, i.e. level, output until the key is released, provided an A.C. source is provided. This level output is received and interpreted by the internal logic of the encoder 102, resulting in an output on a lead 114 calling for continuing automatic repetition of the particular function represented by the accompanying output on the associated lead 108.

The other functions requiring level electrical inputs, which are also recognized by special logic internal to the encoder 102, are controlled by case shift key 106.1 and code shift key 106.2. These shift keys 106 also differ from pulse keys 12 in that they lack elements 54, 56, 58 and 36; but in addition they are further modified in a way which allows them only one operating mode. Specifically, their rods 32 are made so long that when they are depressed sufficiently to release the disk 34 from its magnet 38, the disk 34 is held down against the dielectric layer 52 and static electrodes **50*a* and 50*b*** until the typist releases the key, thus producing only a level output if a suitable A.C. source is employed.

These keys 104 and 106 have output leads 108 and 110 respectively, and their static electrodes 50a and 50b are coupled to each other through intermediate dynamic elements 34 to form variable capacitors. The A.C. source necessary to sustain level outputs is preferably a 1 megahertz sine wave oscillator 116 connected by lead 118 to drive these capacitors. While the keys are actuated, the oscillator output is continuously coupled through the respective key capacitances to respective rectifying and filtering circuits 120, each comprising a series diode, shunt diode and shunt capacitor. One side of each circuit 120 is returned to a bias level VB2, while the other side provides a continuous filtered and rectified (i.e. level) output over one of the leads 122 or 124.

Leads 124, which represent case shift and code shift instructions respectively, go directly to encoder 102; but leads 122, which represent characters, punctuation marks and spacing instructions, must be encoded to the row and column inputs. Since the "pulse or level" keys 104 do not employ electrodes **50*a* and 50*b* as independent outputs, preliminary encoding for these keys must be accomplished by conventional diode buffering. Therefore an encoding matrix 126 is formed by the level key output lines 122 crossing with the row and column leads R and C (the same encoding leads employed by the spike key circuits 46.1 through 46.n) and interconnected in the required logic pattern by a plurality of gating diodes 128. The diodes 128 cooperate for gating purposes with respective biasing diodes 130, which are connected directly to biasing level VB1. Such a diode matrix is considerably more expensive than the printed circuit board 46** discussed above, which requires no diodes for partial encoding.

Input lines R and C carry both the pulse inputs from keys 12 and keys 104 (which result in coded alphanumeric outputs B1 through B7), and the level inputs from keys 104 (which result in "repeat" outputs on line 114). The encoder 102 distinguishes these pulse and level inputs by means of a low pass filter, which is inexpensively provided by connecting one side of an external capacitor 152 to ground. The other side of capacitor 152 is connected, through external lead 150 and suitable internal buffering circuitry, to the internal leads of encoder 102 which carry the R and C inputs to the level signal interpreter portion thereof. Consequently, the capacitor 152 shunts all pulses to ground, and allows only sustained levels to reach the level signal interpreter.

FIG. 5 shows the equivalent electrical circuit of both types of level keys 104 and 106. In effect, leads 118 are connected to leads 108 or 110 through a first variable capacitor (having a static electrode **50*a*) in series with a second variable capacitor (having a static electrode 50*b*). Disk 34 is the dynamic electrode common to both capacitors 50*a*, 34 and 50*b*, 34; and operates them in ganged relationship. The reader will readily appreciate that the series capacitor circuit of FIG. 5 has one-fourth the capacitance of the parallel capacitor circuits 46.1 through 46.*n* in FIG. 3; illustrating that the keys 12** of this invention have a four-to-one advantage in signal amplitude and signal-to-noise ratio.

Thus, it will now be appreciated that this invention provides a snap action keying mechanism with a capacitively coupled output ideally suited for sharp spike signals, and which provides two independent outputs from each keying mechanism to facilitate partial encoding and greatly reduced cost. It avoids dynamic alignment problems by not mounting the movable capacitor electrode on the keystem or projectile; the capacitance, signal output and noise immunity are all quadrupled by comparison to alternative capacitive key designs; and the sequence of key actuations is easily distinguishable. Furthermore, the threshold mechanism employed provides a low, adjustable and consistent key force, with touch feedback. Despite their distinctive characteristics, however, the keyboard and encoding circuitry of this invention are completely compatible with level key mechanisms and circuitry.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. A key for producing an electrical signal between capacitor electrodes comprising a static capacitor electrode, a dynamic capacitor electrode and a dielectric layer therebetween, said dynamic electrode being mounted for flexing movement relative to the static electrode to effect a change in capacitance therebetween, a spacer peripherally interposed between the dynamic electrode and said dielectric layer to separate the dynamic electrode from said dielectric layer and define an aperture through which the dynamic electrode may approach the static electrode, said dynamic electrode being formed of a flexible deformable conductive material overlying said spacer and the aperture to enter said aperture and increase the capacitance between the electrodes upon actuation of the dynamic electrode.

2. The capacitive key as claimed in claim 1 wherein said dynamic electrode is provided with a cut located to place an essentially isolated dynamic electrode segment over the aperture, said cut further being shaped to size said dynamic electrode segment for entry of the aperture and produce the capacitive change upon dynamic electrode actuation.

3. The capacitive key as claimed in claim 1 wherein said static and dynamic electrodes and the dielectric layer form a generally planar layered structure of extended dimensions to encompass a plurality of generally coplanar signal producing pairs of static and dynamic capacitor electrodes and wherein said spacer is in the form of a lattice structure having a plurality of apertures aligned between pairs of static and dynamic capacitor electrodes.

4. The capacitive key as claimed in claim 1 and further including a manually operable key actuating mechanism for flexing said dynamic electrode into the aperture towards the static electrode, said mechanism being formed of a projectile poised to strike against the dynamic electrode and flex it into said aperture, cooperatively mounted magnetic latching elements located to magnetically retain the projectile away from the dynamic electrode, and a keystem which is spring biased mounted with the projectile, said keystem being mounted for movement towards the projectile against the spring bias to apply a force against the projectile in the direction of the dynamic electrode sufficient to overcome said magnetic retention and fire the projectile against the dynamic electrode to impart an abrupt momentary flexure thereto and produce an electrical signal having a steep waveform.

5. The capacitive key as claimed in claim 4 wherein one of said magnetic latching elements is selectively spaced from the dynamic electrode to recapture the projectile for magnetic retention upon rebounding after impact upon said dynamic electrode.

6. The capacitive key as claimed in claim 5 wherein the spring biased keystem further includes a single spring coupling the keystem to the projectile to spring bias the keystem in an inactive position and spring bias the projectile towards the dynamic electrode.

7. The capacitive key as claimed in claim 6 wherein the projectile is further provided with a bumper element formed of an insulating material and mounted for contact with the dynamic electrode upon firing of the projectile.

8. The capacitive key as claimed in claim 3 wherein said lattice shaped spacer is formed of a generally rectangular grid.

9. A key as in claim 8 wherein said lattice is formed of an insulating material.

10. The capacitive key as claimed in claim 3 wherein said dynamic electrode is provided with a plurality of cuts shaped to form generally isolated dynamic electrode segments located in alignment with respective apertures for entry thereof upon respective individual actuation.

11. A capacitive key as claimed in claim 4 wherein said dynamic electrode is provided with two separated oppositely arranged cuts to form a dynamic electrode segment which is connected with spans to the remainder of the dynamic electrode, said segment being located in the path of the fired projectile for impact thereby, said segment being bent by the projectile towards the static electrode while leaving the remainder of dynamic electrode substantially in its normal spaced position from the static electrode.

12. The capacitive key as claimed in claim 4 and further comprising an apertured mechanical-impact protective layer interposed between said dynamic electrode and said projectile, said protective layer having an opening in alignment with the apertures in the spacer to enable said projectile to impact upon the dynamic electrode.

13. A capacitive key for producing an electrical signal between capacitor electrodes comprising a multilayered structure formed of a static electrode layer, a dynamic capacitor electrode layer and a dielectric layer therebetween said dynamic electrode layer being formed of a flexible material, a spacer layer in the form of a lattice structure having a plurality of apertures sized to receive overlying segments of the dynamic electrode for a variation in capacitance, a plurality of key actuating mechanisms disposed over the dynamic electrode layer in alignment with respective segments thereof, said mechanisms including each a projectile poised to strike against the aligned segment of the dynamic electrode to flex it into an aperture, cooperatively mounted magnetic latching elements located to magnetically retain the projectile away from the dynamic electrode and a keystem which is spring biased mounted with the projectile, said keystem being mounted for movement towards the projectile against the spring bias to apply a force against the projectile in the direction of the underlying dynamic electrode segment sufficient to overcome said magnetic retention and fire the projectile against the dynamic electrode to impart an abrupt momentary flexure thereto into an aperture for the production of an electrical signal.

14. The capacitive key as claimed in claim 13 wherein each segment is provided with a cut shaped to enhance flexibility thereof and effectively isolate adjacent segments from each other.

* * * * *